G. M. EATON.
LOCOMOTIVE CONSTRUCTION.
APPLICATION FILED NOV. 18, 1916.
1,318,735.
Patented Oct. 14, 1919.
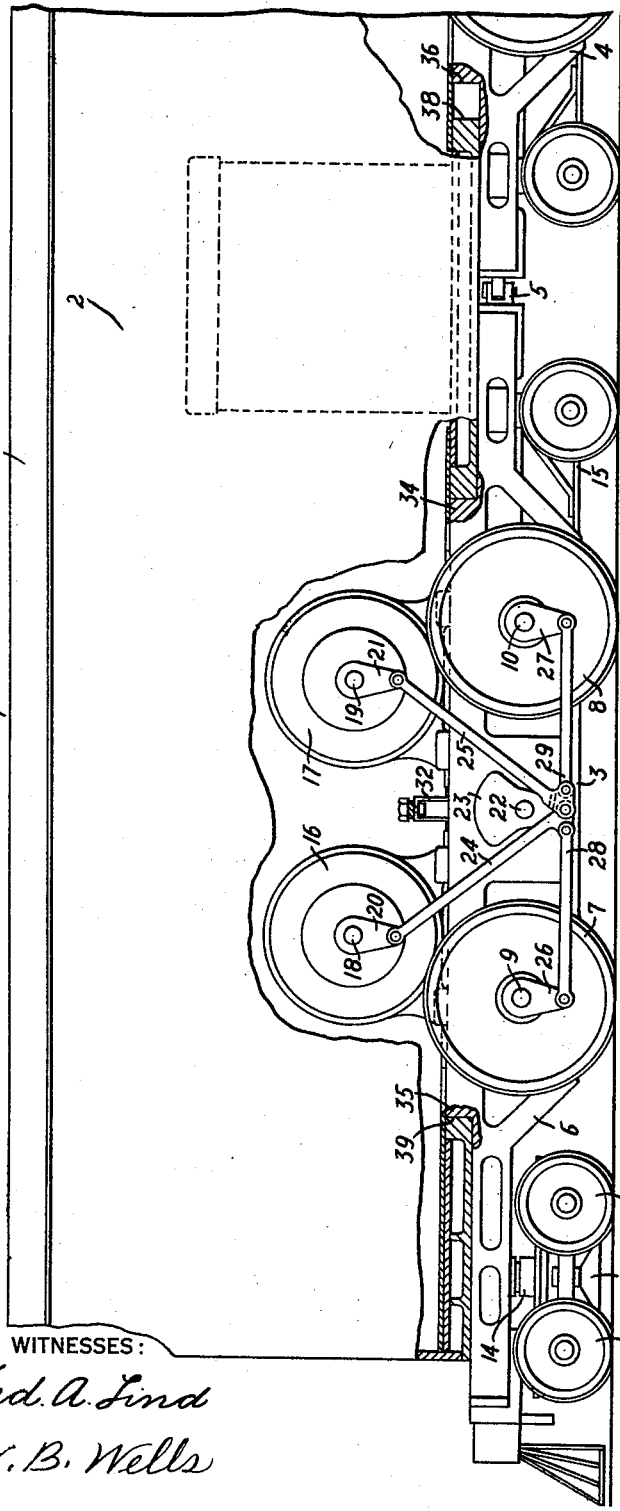
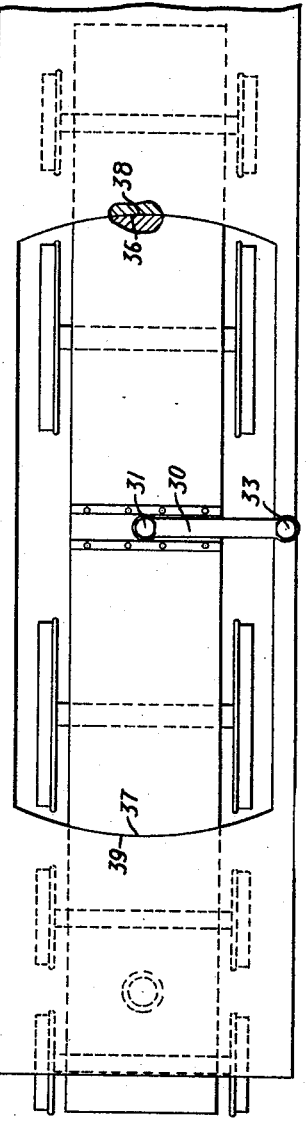
WITNESSES:
Fred. A. Lind
W. B. Wells
INVENTOR
George M. Eaton
BY
Wesley G. Carr
ATTORNEY
THE COLUMBIA PLANOGRAPH CO., WASHINGTON, D. C.

UNITED STATES PATENT OFFICE.

GEORGE M. EATON, OF PITTSBURGH, PENNSYLVANIA, ASSIGNOR TO WESTINGHOUSE ELECTRIC AND MANUFACTURING COMPANY, A CORPORATION OF PENNSYLVANIA.

LOCOMOTIVE CONSTRUCTION.

1,318,735.  Specification of Letters Patent.  Patented Oct. 14, 1919.

Application filed November 18, 1916. Serial No. 132,091.

*To all whom it may concern:*

Be it known that I, GEORGE M. EATON, a citizen of the United States, and a resident of Pittsburgh, in the county of Allegheny and State of Pennsylvania, have invented a new and useful Improvement in Locomotive Construction, of which the following is a specification.

My invention relates to vehicles and particularly to electric locomotives having pivotal running gears.

One object of my invention is to provide means for joining the running gear of a locomotive to the cab thereof, which shall be located substantially outside the central vertical plane of the locomotive and permit the running gear to rotate relative to the cab about a center located within the central vertical plane of the locomotive.

More specifically, my invention embodies a locomotive having a cab and a running gear connected thereto by means of the above-indicated character which is located substantially outside the central vertical plane of the locomotive. The connecting means between the cab and the running gear embodies a link pivotally connected to the cab and to the running gear, so that the running gear is restrained from lateral movement relative to the cab but is permitted to have rotative movement relative thereto, and concentric abutting surfaces on the cab and the running gear for restraining the running gear from longitudinal movement relative to the cab and for permitting a movement of rotation therebetween.

In many locomotives now in service, the cab and each individual running gear are connected together by a pivotal connection located substantially in the central vertical plane of the locomotive so that the running gear may have rotative movement relative to the cab. However, in many locomotives having motors mounted on the running gears near the centers thereof, the placing of pivotal connections in the central vertical planes of the locomotives is impractical, as the connecting means would be joined to the running gears below the motors, and to the cabs above the motors. In a locomotive of the above type, constructed in accordance with my invention, the difficulty above set forth is obviated by providing a pivotal connection between the cab and the running gear which is located outside the central vertical plane of the locomotive but which permits the running gear to rotate relative to the cab about a center within the central vertical plane of the locomotive.

In the accompanying drawing, Figure 1 is a side elevational view, partially in section, of a portion of a locomotive constructed in accordance with my invention, and Fig. 2 is a partial plan view of the locomotive illustrated in Fig. 1.

Referring to Fig. 1 of the drawing, a locomotive 1 comprises a cab 2 and two running gears 3 and 4 which are connected together by means of the articulated connection 5.

As the running gears 3 and 4 are similar in construction, with one exception which will be pointed out in detail, only one running gear, namely, the running gear 3, will be described in detail. The running gear 3 embodies side frames 6, two pairs of driving wheels 7 and 8 which are respectively mounted on the driving axles 9 and 10, a pivotal guiding truck 11 having two pairs of wheels 12 and 13 and joined to the side frames 6 by means of a pivotal connection 14, and a two-wheel radial truck 15.

Two motors 16 and 17, having armature shafts 18 and 19 and crank disks 20 and 21 mounted thereon, are mounted on the side frames 6 of the running gear 3 substantially over the driving wheels 7 and 8. A jack shaft 22, having crank disks 23 mounted thereon, is disposed between the two pairs of driving wheels 7 and 8. The crank disks 23 on the jack shaft 22 are connected to the crank disks 20 and 21 of the motors 16 and 17 by side rods 24 and 25, respectively. The crank disks 23 are also connected to crank disks 26 and 27, which are respectively mounted on the driving axles 9 and 10, by means of the side rods 28 and 29.

The means for connecting the running gear 3 to the cab 2 embodies a link 30, having a pivotal connection 31 to a point at the center of the truck bolster 32 of the running gear, and a pivotal connection 33 to the frame of the cab 2. The link 30 permits the running gear 3 to have a movement of rotation relative to the cab 2 but restrains the same from lateral movement relative thereto. Near the ends of the running gear 3 and adjacent to the motors 16 and 17, are truck-frame cross-ties 34 and 35 which have cylindrical surfaces 36 and 37 that have a center in the central vertical axis of the running gear. Coöperating with the cylindrical surfaces 36 and 37 are concentric surfaces 38 and 39 on the frame of the cab 2. Thus, the concentric surfaces 36 and 37 on opposite sides of the transverse center line of the running gear and the surfaces 38 and 39 on the cab permit the running gear 3 to have a movement of rotation relative to the cab but prevent the same from having any longitudinal movement relative thereto.

The running gear 4 differs from the running gear 3 in that the surfaces 36 and 37 on the running gear and the surfaces 38 and 39 on the cab are not in contact. A space is left between the above-mentioned surfaces on the running gear and on the cab, so that, in case the articulated connection 5 between the two running gears 3 and 4 develops lost motion, the torque developed by the locomotive will, in no case, be transmitted through the cab but always through the running gears.

Variations in the structure and arrangement and location of parts may be made without departing from the spirit and scope of my invention, and such modifications are intended to be covered by the appended claims.

I claim as my invention:

1. In a locomotive, the combination with a cab and a plurality of articulated running gears, of pivotal links for joining the running gears to the cab and for restraining the same, relative to the cab, in a transverse direction, and means for restraining one of said running gears, relative to said cab, in a longitudinal direction.

2. In an electric vehicle, the combination with a body portion and a running gear for supporting said body portion, of means for pivotally connecting the running gear to the body portion and comprising a pivotal link for restraining the running gear from transverse movement relative to the body portion and curved surfaces respectively located on the running gear and on the body portion for restraining the running gear from longitudinal movement relative to the body portion.

3. In an electric vehicle, the combination with a body portion and articulated running gears for supporting said body portion, of means, comprising pivoted links for restraining the running gears from having a lateral movement relative to the body portion and for permitting the running gears to have a movement of rotation relative thereto.

4. In an electric locomotive, the combination with a cab and articulated running gears for supporting said cab, of means, comprising pivoted links, for connecting said running gears to the cab and for restraining the running gears from lateral movement with relation thereto, and means comprising concentric abutments on one of said running gears and on said cab for restraining said running gears longitudinally with respect to the cab, whereby the running gears may have rotative movement relative to the cab and be restrained from longitudinal and lateral movement relative thereto.

5. In a locomotive, the combination with a cab and two articulated running gears for supporting said cab, of means comprising pivoted links for joining each running gear to the cab and for restraining the same from lateral movement relative thereto, and means, comprising concentric abutments on one of said running gears and on said cab, for restraining said running gears from longitudinal movement relative to the cab.

6. In an electric vehicle, the combination with a cab and two articulated running gears for supporting said cab, of means, comprising pivoted links, for restraining said running gears from lateral movement relative to the cab, said links being joined to each running gear at a point in the vertical central axis thereof, and means comprising concentric abutments on one of said running gears for restraining said running gears from longitudinal movement relative to the cab.

7. In a vehicle, the combination with a body and a running gear therefor, of means, comprising a pivoted link, for restraining said running gear from lateral movement relative to the body portion, and means on opposite sides of the transverse central plane for restraining the running gear from longitudinal movement relative to the body, whereby the running gear may have a movement of rotation relative to the body.

8. In an electric locomotive, a cab, articulated running gears supporting the same, and means comprising pivoted links and concentric abutments for permitting each of said running gears to rotate relative to the cab, said concentric abutments being located substantially remote from the center of rotation of each of said running gears.

9. In an electric locomotive, a cab, articulated running gears, means symmetrically disposed relative to the center of rotation of one of said running gears for preventing displacement of the cab relative to the running gears along a predetermined line, and means, unsymmetrically displaced relative to the center of rotation of each of said trucks, for preventing displacement of said cab, relative to the running gears, along a line making an angle of ninety degrees with said first-mentioned line.

10. In an electric locomotive, the combination with a cab having pairs of spaced transversely-extending curved surfaces, of articulated running gears supporting the same, each runnig gear having a pair of spaced transversely-extending curved surfaces coöperating with a pair of curved surfaces on the cab to limit the longitudinal movement of the running gear with relation to the cab, but permitting relative rotative movements of the running gear about a point in the space between each pair of said coöperating surfaces, and means in each of said spaces for restraining the lateral movement of the running gears relatively to said cab.

In testimony whereof, I have hereunto subscribed my name this 28th day of Oct., 1916.

GEORGE M. EATON.

Copies of this patent may be obtained for five cents each, by addressing the "Commissioner of Patents, Washington, D. C."